United States Patent Office 3,022,249
Patented Feb. 20, 1962

3,022,249
WELL FRACTURING LIQUID
John F. Eberhard, Tulsa, Okla., assignor to The Dow Chemical Company, Midland, Mich., a corporation of Delaware
No Drawing. Filed Aug. 12, 1959, Ser. No. 833,131
7 Claims. (Cl. 252—8.55)

The invention relates to treating a well penetrating a fluid-bearing formation. In particular it relates to the treatment of such wells to increase the productivity of fluids from the formation.

Fluids contained in subterranean strata are removable only when such strata are permeable to some extent and the fluid therein is subjected to a pressure differential. The greater the degree of permeability of the strata, the less resistance is offered to the movement of the fluid through or from such strata. Likewise, the greater the pressure differential, the more rapidly and completely the fluid can be removed from the formation.

Therefore, permeability and pressure differential are essential for the removal of fluids from subterranean formations, and when such conditions do not exist, fluids remain locked in strata comprising such formations unless the strata are rendered permeable and are made accessible to outside pressures.

When a subterranean formation, containing a fluid, e.g., water, brine, oil or natural gas, is penetrated by a well, such formation is usually permeable to a sufficient extent to permit some passage therethrough of the fluid. Usually the fluid-bearing stratum or strata rests on an impermeable base rock and is capped by an impermeable cap rock. There may be sufficient natural pressure in the fluid-bearing strata so that when the cap rock of the formation is perforated by the well, the fluid moves by natural causes toward the well. In some instances the pressure differential is great enough to cause the fluid to rise to the surface of the ground. Usually, however, the pressure differential is not great enough to accomplish this rise, or if sufficient when the formation is first penetrated, falls off and becomes insufficient after a time.

Means such as gas and air lifts, water or gas displacement, and pumps are used to create a pressure differential which is sufficient to cause the fluid to move to the well and from there to the surface of the ground.

Production of fluids from a fluid-bearing formation continues from a well only so long as the formation between the fluid in place and the well provides passage therethrough by communicating channels, pores, fissures, or the like.

The productivity of the well, such as an oil or gas well, has frequently declined, long before the oil or gas has all been removed from the formation despite the employment of means for increasing the pressure differential between the well and the fluid-bearing formation. Such decline has often reached a point where production costs have become too great to justify further operation of the well.

Various methods of increasing the rate of flow and length of production life of wells have been proposed. Among such methods have been the introduction and detonation of explosives in the fluid-bearing strata. Difficulty in controlling fractures produced by the detonation of explosives and the hazards associated with the use thereof have tended to limit their use and effectiveness. Enlarging the wellbore, drilling horizontally, and perforating the strata outwardly from the wellbore have been done in attempting to provide improved passage of fluids therethrough. The increase in production resulting from such attempts have not justified their extensive use.

More effective methods of increasing production are acidizing and hydraulic fracturing of fluid-bearing formations. Acidizing is used in acid-soluble formations such as those comprising limestone or dolomite and is not effective in predominately sandstone formations. Acidizing consists essentially of injecting an aqueous solution of HCl, usually containing an inhibitor to metal corrosion, e.g., an arsenic compound, into a well requiring treatment. The inhibited HCl solution reacts with the calcium carbonate of the formation to form the water-soluble calcium chloride, carbon dioxide, and water. Hydraulic fracturing consists essentially of injecting a liquid into a formation and breaking apart rocks of the formation by means of hydraulic pressure created. Hydraulic fracturing may be used in either acid-soluble or acid-insoluble formations.

One difficulty associated with hydraulic fracturing is excessive loss of the fracturing liquid into the formation, thereby preventing the attainment of sufficiently high pressure to fracture the formation.

It is therefore a requirement for a satisfactory fracturing liquid that the loss of the liquid therefrom into the formation be sufficiently low to permit fracturing pressures to build up in the formation. Fluid loss into the formation is lessened by imparting to the fracturing liquid the property of temporarily plugging and plastering the exposed faces of the more accessible channels and passageways in the formation and thereby to divert the fracturing liquid into the more constricted and less accessible channels of the formation. High pressures are thus built up which result in fractures emanating from the constricted channels into the formation. To attain these ends, additaments known as fluid-loss preventives are advantageously admixed with the fracturing liquid. Among such fluid-loss preventives are pulverized inorganic materials, e.g., silica flour and slate flour, lignin compounds such as alkali lignins among which are sodium lignate and sodium lignosulfonate, and chemicals which have a plugging effect when added but which, after coming in contact with one another after a limited time, form a soluble compound.

Although progress has been made in lessening fluid loss from fracturing liquids by the use of such agents, there is still appreciable loss experienced upon the use of fracturing liquids containing known fluid loss preventives. There still exists a need for an improved fluid loss preventive of greater effectiveness for use in fracturing formations penetrated by a well.

One of the more effective fluid loss preventives is lignin suspended in an acid medium such as described in U.S. Patent 2,877,180. When such composition is injected into a well during a fracturing operation, the lignin, being insoluble in the acid medium, produces a plugging effect thereby lessening fluid loss. Thereafter, the pH rises due to the alkaline effect of the fluids found in most subterranean formations. As a result, the solubility of the lignin compound increases and the fracturing liquid loses its plugging property and is flowed out of the well with the fluid being produced. Another known fluid loss preventive is the starch of soya beans as described in U.S. Patent 2,488,304.

Each of the substances described in these patents has lessened fluid loss to some extent. However, as now employed according to the known methods of use, neither soya flour nor sodium lignin or sodium lignosulfonate used singly has satisfactorily reduced fluid-loss in fracturing liquids, particularly at higher temperatures encountered in well treatment.

The present invention is predicated on the discovery that a pronounced synergistic effect as regards control of fluid loss of an aqueous well treating fluid is obtained when a mixture of soya flour and a lignin compound is added thereto. Lignin in its natural state is a high molecular weight, amorphous, polymeric substance characterized by the presence of methoxyl groups and by both phenoxy hydroxyl and aliphatic hydroxyl groups.

The lignin compound useful in the practice of the invention is either lignin, sulfonated lignin, an alkali metal or ammonium salt of lignin known as a lignate, or an alkali metal or ammonium salt of sulfonated lignin known as a ligno-sulfonate. Among such alkali metal salts are those of sodium, potassium, and lithium. Lignin compounds useful in the practice of the invention include such compounds which are prepared in the presence of an amount of lignin in excess of the stoichiometric quantity and therefore reference to such compounds includes those containing some free lignin. The preparation of alkali metal salts of lignin and lignosulfonate and the characteristics of such products are described in Wood Chemistry, 2nd Edition (Wise and Jahn), under the chapter headed "Chemistry of Lignin."

The alkali metal lignate used in the invention is exemplified by sodium lignate prepared from the black liquor formed as a by-product during wood-pulping operations, employing (1) the kraft or sulphate process or (2) the soda process. The two processes are of similar nature but differ in that the sulfate process employs an aqueous solution of $Na_2S$ and $NaOH$ whereas the soda process employes chiefly only the $NaOH$ in solution. In either process an alkali lignin is formed. Alkali lignin is insoluble in inorganic acids and organic hydrocarbons and substantially insoluble in water.

Examples of alkali lignins, often referred to as alkali metal lignates, are Indulin B and Indulin C which are the purified and crude sodium salts, respectively, of pine wood lignin. An example of lignin is Indulin A which is purified pine wood lignin.

Alkali metal lignosulfonates suitable for the practice of the invention are best illustrated by the sodium salt of lignosulonfic acid made from the spent liquor produced during pulping operations employing the sulfite process. The sulfite process differs from the above briefly described sulphate or soda processes in that an aqueous solution of bisulfite, e.g., $NaHSO_3$ and $SO_2$, are employed in the sulfite process. The sodium lignosulfonate product thus produce usually contains between 50 and 65 percent sulfonated lignin, largely as the metal salt thereof. The sulfur content is usualy between 8 and 12 percent. Although $Ca(SO_3)_2$ is sometimes employed in the sulfite process, the lignosulfonate so formed is not recommended for the practice of the invention.

Examples of commercially available sodium lignosulfonates suitable for the practice of the invention are Maraspers N, Polyfon F, and Polyfon H.

Soya flour is made from dehulled soy beans, a legume which produces seeds rich in protein, oil and carbohydrates. The dehulled beans are cleaned, given a steam treatment for 10 to 15 minutes, flaked, and thereafter ground in a hammer mill and subsequently refined as desired to produce the following general classes of soya flour:

(1) Full fat, which contains substantially all the fat originally in the seed;

(2) Low fat, which is made from the pressed soy bean cake from which a portion of the oil has been pressed out;

(3) De-fatted, which is almost completely free from oil, the oil having bean chemically extracted therefrom.

Anyone of these three general types of soya flour is satisfactory, available, and suitable for the practice of the invention.

The following soya flours are illustrative of those suitable for the practice of the invention.

|  | Percent moisture | Percent protein | Percent fat | Percent fiber |
|---|---|---|---|---|
| Soyalose 105 | 7.5 | 50.5 | 5.5 | 2.4 |
| Soyafluf | 7.5 | 53.0 | 0.8 | 2.5 |
| Soyarich | 6.0 | 42.0 | 22.0 | 2.3 |
| Central 200 | (¹) | 52.0 | 1.0 | (¹) |

¹ Not determined.

The fluid loss preventive composition of the invention consists of between 9 and 2.3 parts by weight of soya flour to 1 part by weight of the lignin compound. It preferably consists of between 9 and 3 parts soya flour to 1 part by weight of the lignin compound. A weight ratio of about 4 parts of soy bean flour to 1 part of lignin compound is usually employed. The well treating fluid to which the fluid loss preventive is added is essentially aqueous, e.g., water, hydrochloric acid, and fluid oil-water emulsions, any of which may contain suspended additaments, e.g. sand. The amount of the fluid-loss preventive to employ is between 5 and 200 pounds, and preferably between 10 and 100 pounds, of the mixture per 1000 gallons of aqueous well treating fluid. The well treating liquid containing the fluid loss preventive is injected into the well according to conventional practice, e.g., that described in Reissue Patent 23,733 to Farris.

The following tests were run to show the effect on fluid loss of aqueous media to which were admixed varying amounts of either a lignin compound or soya flour alone or of mixtures of the two in accordance with the invention.

The tests were prepared by admixing the additaments with the aqueous medium in a suitable size mixer until a substantially homogeneous fluid mixture was obtained. The fluid loss of the fluid mixture thus prepared was determined at the relatively low temperature and pressure of 80° F. and 100 p.s.i.g. and a filter area of 7 square inches, according to the procedure described in Section IV of Standard Field Procedure for Testing Drilling Fluids API RP 29, 3rd Edition (May 1950). The fluid loss at an elevated temperature and high pressure was determined by employing the high temperature-high pressure filter press at 200° F. and 1000 p.s.i.g. and a filter area of 3.5 square inches according to the procedure described in Section IV of Testing Oil-Well Cements and Cement Additives employing the apparatus of paragraph 6 thereof.

The series of tests which are set out in Tables I and II, were run to show specifically the effect on fluid loss of a 15 percent aqueous HCl solution and of water obtained by admixing therewith the amounts set out in the tables of either soya flour or sodium lignate alone or of a dry mixture consisting of 4 parts by weight of soya flour and 1 part of sodium lignate. In the tests on the HCl solution, 0.4 percent butane-diol was added as a corrosion inhibitor. The amount of additament, temperature, and fluid loss of the tests on the aqueous HCl solution are set out in Table I and those of the tests on water in Table II.

TABLE I

| Test No. | Additament in lb./1,000 gal. of aqueous 15 percent HCl | Temp. in ° F. | Pressure in p.s.i.g. | Fluid loss in ml. |
|---|---|---|---|---|
| 1 | 167 sodium lignate | 80 | 100 | 245 in 30 min. |
| 2 | 83 soya flour | 80 | 100 | 35 in 30 min. |
| 3 | 50 (4 parts soya flour, 1 part sodium lignate) | 80 | 100 | 25 in 30 min. |
| 4 | 100 (4 parts soya flour, 1 part sodium lignate) | 80 | 100 | 19 in 30 min. |
| 5 | 50 soya flour | 200 | 1,000 | 69 in 30 min. |
| 6 | 50 (4 parts soya flour, 1 part sodium lignate) | 200 | 1,000 | 31 in 30 min. |
| 7 | 50 sodium lignate | 200 | 1,000 | 300 in 28 sec. |

TABLE II

| Test No. | Additament in lb./1,000 gal of water | Temp. in °F. | Pressure in p.s.i.g. | Fluid loss in ml. |
|---|---|---|---|---|
| 8 | 100 sodium lignate | 80 | 100 | 59 in 30 min. |
| 9 | 50 soya flour | 80 | 100 | 71 in 30 min. |
| 10 | 50 (4 parts soya flour, 1 part sodium lignate) | 80 | 100 | 28 in 30 min. |
| 11 | 100 (4 parts soya flour, 1 part sodium lignate) | 80 | 100 | 17 in 30 min. |
| 12 | 50 soya flour | 200 | 1,000 | 65 in 30 min. |
| 13 | 50 (4 parts soya flour, 1 part sodium lignate) | 200 | 1,000 | 31 in 30 min. |
| 14 | 50 sodium lignate | 200 | 1,000 | 300 in 1.5 min. |

An examination of Tables I and II shows that a mixture of 4 parts of soya flour and 1 part sodium lignate produces a pronounced synergistic effect on lessening fluid loss in water and in aqueous HCl solutions. This is evidenced by the fact that the combined effect on fluid loss of the two materials together is significantly greater than that of either material alone when used in an amount similar to the combined weights of the two together. They also show that the synergistic effect is more marked at 200° than at 80° F.

A second series of tests which are set out in Tables III and IV were run similarly to those of Tables I and II to show the effect on fluid loss of water and of 15 percent aqueous HCl solutions obtained by admixing, per 1000 gallons of water or HCl solution, 50 pounds of either soya flour or sodium lignate alone or 50 pounds of a dry mixture consisting of varying ratios of soya flour and sodium lignate at different temperatures selected above 80° and below 200° F. The fluid loss in this series of tests was determined by employing the Baroid HT-HP filter press at the temperatures and pressures shown in Tables III and IV. It will be noted that the beneficial effect on fluid loss falls off sharply at a ratio of about 2.3 soya flour to 1 part, by weight, of the lignin compounds.

TABLE III

| Test No. | Parts by weight of fluid loss preventive in aqueous 15 percent HCl +0.4 percent butane-diol | | Fluid loss in ml. at— | | |
|---|---|---|---|---|---|
| | Soya flour | Sodium lignate | 120° F. | 150° F. | 175° F. |
| 15 | 10 | 0 | 41 in 30 min | 59 in 30 min | 67 in 30 min |
| 16 | 9 | 1 | 34 in 30 min | 33 in 30 min | 37 in 30 min |
| 17 | 8 | 2 | 23 in 30 min | 29 in 30 min | 30 in 30 min |
| 18 | 7 | 3 | 31 in 30 min | 37 in 30 min | 40 in 30 min |
| 19 | 6 | 4 | 60 in 30 min | 69 in 30 min | 75 in 30 min |
| 20 | 5 | 5 | 205 in 30 min | 275 in 30 min | 300 in 30 min |
| 21 | 1 | 9 | 300 in 10 min | 300 in 8 min | 300 in 4.5 min |
| 22 | 0 | 10 | 300 in 43 sec | 300 in 39 sec | 300 in 31 sec |

TABLE IV

| Test No. | Parts by weight of fluid loss preventive in water | | Fluid loss in ml. at— | | |
|---|---|---|---|---|---|
| | Soya flour | Sodium lignate | 120° F. | 150° F. | 175° F. |
| 23 | 10 | 0 | 49 in 30 min | 63 in 30 min | 65 in 30 min |
| 24 | 9 | 1 | 33 in 30 min | 31 in 30 min | 36 in 30 min |
| 25 | 8 | 2 | 32 in 30 min | 30 in 30 min | 30 in 30 min |
| 26 | 7 | 3 | 39 in 30 min | 43 in 30 min | 47 in 30 min |
| 27 | 6 | 4 | 69 in 30 min | 80 in 30 min | 88 in 30 min |
| 28 | 5 | 5 | 160 in 30 min | 145 in 30 min | 180 in 30 min |
| 29 | 1 | 9 | 300 in 22 min | 300 in 19 min | 300 in 12 min |
| 30 | 0 | 10 | 300 in 4.3 min | 300 in 4.3 min | 300 in 2 min |

Tests 16, 17 and 18 of Table III and Tests 24, 25, and 26 of Table IV show that a ratio of between 9 and 7 of soya flour to between 1 and 3 of the lignin, i.e., between 9 and 2.3 of soya flour to 1 of the lignin compound produce satisfactory results and are, therefore, illustrative of the practice of the invention. Other tests of the tables show that when the ratio of soya flour to the lignin compound is not greater than 6 soya flour to 4 parts of lignin, i.e., not greater than 1.5 parts soya to 1 lignin compound, the results are unsatisfactory and are, therefore, not illustrative of the practice of the invention. Tests 16 and 17 of Table III and Tests 24 and 25 show that the ratios there employed represent preferable ratios, viz., 9:1 and 4:1 soya flour to lignin compound rather than the ration represented by Examples 18 and 26, viz., 2.3 soya flour to 1 lignin compound.

A third series of tests was run, following, generally, the procedure of the above tests, to show the effect on fluid loss of adding varying amounts of the mixture, consisting by weight of 4 parts soya flour and 1 part sodium lignate to either water alone and to water acidified with hydrochloric acid to provide a concentration of HCl therein of 15 percent. Soyalose 105 was used as the soya flour and Indulin C as the sodium lignate. The fluid loss was determined by the API test indicated on Table V.

TABLE V

| Test No. | Soya flour-lignin additament in lb./1,000 gal. of HCl solution | Fluid loss in ml. | Test Employed |
|---|---|---|---|
| 31 | 2.5 | 300 in 11.5 min | API RP 29. |
| 32 | 5 | 300 in 24.75 min | Do. |
| 33 | 10 | 51 in 30 min | Do. |
| 34 | 25 | 34 in 30 min | Do. |
| 35 | 50 | 22 in 30 min | Do. |
| 36 | 75 | 19.5 in 30 min | Do. |
| 37 | 100 | 19 in 30 min | Do. |
| 38 | 200 | 18 in 30 min | Do. |
| 39 | 5 | 185 in 30 min | Do. |
| 40 | 10 | 71 in 30 min | Do. |
| 41 | 20 | 45 in 30 min | Do. |
| 42 | 25 | 43 in 30 min | Do. |
| 43 | 50 | 28 in 30 min | Do. |
| 44 | 100 | 17 in 30 min | Do. |
| 45 | 15 | 75 in 30 min | Baroid HT-HP. |
| 46 | 25 | 48 in 30 min | Do. |
| 47 | 50 | 31 in 30 min | Do. |

Examination of the results of Table V shows that admixing as little as 5 pounds of the soya flour-sodium lignate mixture per 1000 gallons of aqueous solution substantially reduces fluid loss, but that sharply increased fluid loss reduction occurs when at least 10 pounds of the mixture per 1000 gallons of the solution is used. The table also shows that no advantage is seen in using more than about 200 pounds of the soya flour-sodium lignate mixture per 1000 gallons of fracturing liquid and that 100 pounds of the mixture per 1000 gallons of liquid appears to be sufficient. The preferred limits based upon the results of Table V, therefore, are between about 10 and 100 pounds of the mixture per 1000 gallons of the aqueous fracturing liquid. An amount of the mixture usually employed is about 50 pounds per 1000 gallons of fracturing liquid.

A fourth series of tests was run to show the effect of employing different types of soya flour and lignin compound to prepare the additament employed in the invention. A mixture of 4 parts by weight of the soya flour and 1 part of the lignin compound, as identified in Table VI, was made up, added to water, in an amount of 50 pounds of the mixture per 1000 gallons of water and the aqueous mixture and then acidified to a concentration of 15 percent HCl as in the above tests. Fluid loss values, determined according to API RP 29, at 80° F., is set out in Table VI.

TABLE VI

| Test No. | Fluid loss mixture added in an amount of 50 pounds per 1,000 gallons of 15 percent aqueous HCl solution | | Fluid loss in ml./30 min. |
|---|---|---|---|
| | Soya flour | Lignin compound | |
| 48 | Soyalose 105 | Indulin C | 22 |
| 49 | Soyafluf flour | do | 19 |
| 50 | Soyarich flour | do | 27 |
| 51 | Central 200 | do | 23 |
| 52 | Soyalose 105 | Indulin A | 23 |
| 53 | do | Indulin B | 22 |
| 54 | do | Lignox | 34 |
| 55 | do | Polyfon H | 38 |

An examination of the results of Table VI shows that satisfactory fluid loss is obtained when a mixture of any of a number of common types of soya flour and common types of lignin compounds, which are readily available, are employed.

A fifth series of tests was run to show the effect of adding the fluid-loss preventive employed in the invention to different aqueous acid solutions. The tests of this series were run on solutions prepared by admixing 50 pounds of a mixture of 4 parts by weight of Soyalose 105 to 1 of Indulin C, to each of the aqueous acid solutions of the type and concentration set out in Table VII. Fluid loss values determined according to API RP 29 were run on the thus treated acidic solution and are set out in Table VII.

TABLE VII

| Test No. | Aqueous acidic solution employed | Fluid loss in ml./30 min. according to API RP 10B at 80° F. |
|---|---|---|
| 49 | 3 percent hydrochloric | 25 |
| 50 | 28 percent hydrochloric | 36 |
| 51 | 10 percent phosphoric | 39 |
| 52 | 10 percent acetic | 41 |
| 53 | 10 percent citric | 44 |

Table VII shows that each of the acidic solutions, which had admixed therewith the soya flour-lignin additament in accordance with the practice of the invention, had satisfactory fluid loss values.

The following examples are illustrative of well treatments in accordance with the practice of the invention.

Field Example 1

The well treated in this example was located in Park County, Wyoming. It had a total depth of 3795 feet and was cased with a 7-inch casing to a depth of 3760 feet. The pay zone extended between the 3760 and 3795 foot levels. There was no tubing in the well during treatment.

The production rate of the well prior to the fracturing treatment according to the invention was 19 barrels of oil and 34 barrels of water per day.

A dry composition consisting of a mixture of 120 pounds of low fat soya flour known as Soyalose 105 and 30 pounds of sodium lignate known as Indulin C (a 4:1 weight ratio, respectively), was prepared.

The treatment of the well proceeded as follows:

100 barrels (4200 gallons) of water were pumped into the well, resulting in a pressure at the well head of 1400 p.s.i., which produced an initial breakdown of the formation as indicated by a drop in pressure to 1250 p.s.i. Then 425 barrels (17,850 gallons) of water were pumped into the well while the 150 pound mixture of soya flour-sodium lignate mixture, prepared above, and 15,000 pounds of a 20 to 40 mesh (U.S. Standard sieve series) of Ottawa sand were simultaneously fed into a blender and the resulting mixture fed into the water line leading into the well at the rate of 84 pounds of mixture per 1000 gallons of water which required a period of time of about 25 minutes. During this period, the pressure underwent several successive abrupt drops resulting in a final reading of 900 p.s.i.

The well was then flushed out by pumping 150 barrels (6300 gallons) of water into the well and then releasing the pressure and allowing the fluids to flow back out of the well.

The well was then put back in production and averaged 40 barrels of oil and 48 barrels of water per day.

Field Example 2

The well treated in this example was located in Hot Springs County, Wyoming. It had a total depth of 4305 feet and a pay zone extending between 4112 and 4141 feet. The pay zone was perforated with 4 perforations per foot. The well was provided with a 2½ inch tubing extending to a depth of 4080 feet. The well prior to treatment was producing 6 barrels of oil and 26 barrels of water per day. A conventional type packer was positioned in the annulus between the tubing and the wellbore wall near the lower end of the tubing. Water was pumped into the annulus above the packer to resist upward thrust of the packer during treatment. The well was to be acidized in accordance with the invention.

The composition employed was prepared as follows: 276 gallons of water were placed in a portable paddle-type mixer. To the water were then admixed 2 gallons of an arsenic-type inhibitor and 5 gallons of kerosene as a supplemental inhibitor to corrosion. There was then admixed with the water 25 pounds of a dry mixture consisting of 4:1 parts by weight Soyalose 105:Indulin C, as used in Field Example 1. Then 224 gallons of 31 percent by weight hydrochloric acid was admixed with the aqueous solution to prepare about 500 gallons of a 15 percent aqueous solution containing the fluid-loss preventive according to the invention. The acid solution was then injected into the well following conventional acidizing procedure and the acid solution was followed by 24 barrels of water to force the acid solution back into the formation.

The water and solution were then pumped from the well. The well was then put back in production and produced 98 barrels of oil and 52 barrels of water per day.

An examination of the field examples shows that the treatment of wells including both fracturing and acidizing, clearly improved the production of the well without appreciable inconvenience or cost over conventional treatment.

Having described the invention, what is claimed and desired to be protected by the Letters Patent is:

1. An aqueous well treating composition comprising a mixture consisting of between 9 and 2.3 parts by weight of soya flour and 1 part by weight of a lignin compound selected from the class consisting of lignin, sulfonated lignin, alkali metal salts of lignin, and alkali metal salts of lignosulfonic acid, in an amount of between 10 and 100 pounds of said mixture per 1000 gallons of said aqueous composition.

2. An acidic aqueous well treating composition comprising a mixture consisting of between 9 and 2.3 parts by weight of soya flour and 1 part of a lignin compound selected from the class consisting of lignin, sulfonated lignin, alkali metal salts of lignin, and alkali metal salts of lignosulfonic acid in an amount of between 5 and 200 pounds of said mixture per 1000 gallons of a 5 to 25 percent by weight aqueous solution of HCl.

3. The well treating composition of claim 2 which contains an inhibitor to acidic corrosion of metals.

4. The well treating composition of claim 2 wherein the lignin compound is sodium lignate.

5. The well treating composition of claim 2 wherein the lignin compound is sodium lignosulfonate.

6. The method of treating a well penetrating a subterranean formation which comprises injecting into the well and forcing back into the formation the aqueous composition of claim 2.

7. The method of treating a well penetrating a subterranean formation which comprises injecting into a well and back into the formation the aqueous composition of claim 5.

References Cited in the file of this patent

UNITED STATES PATENTS

| | | |
|---|---|---|
| 2,392,302 | Baker et al. | Jan. 8, 1946 |
| 2,488,304 | Malott | Nov. 15, 1949 |
| 2,702,754 | Rao et al. | Feb. 22, 1955 |
| 2,801,218 | Menaul | July 30, 1957 |
| 2,877,180 | Park et al. | Mar. 10, 1959 |